Dec. 30, 1930.   E. P. BURRELL   1,786,698
APPARATUS FOR CUTTING MATERIALS
Filed Feb. 6, 1926
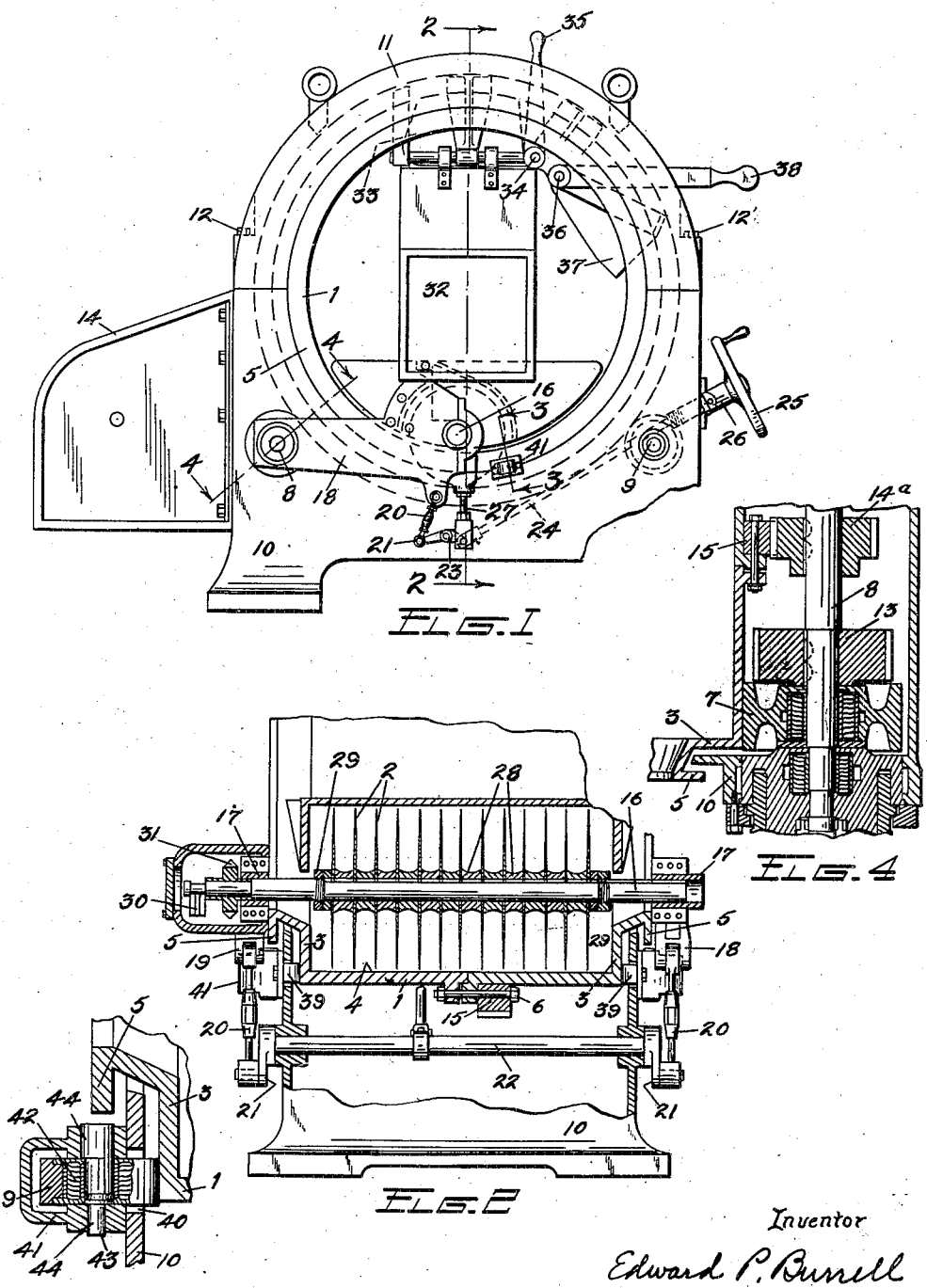
Inventor
Edward P. Burrell
By Richey Watts Attorneys Patented Dec. 30, 1930

1,786,698

UNITED STATES PATENT OFFICE

EDWARD PARKER BURRELL, OF CLEVELAND, OHIO, ASSIGNOR, BY MESNE ASSIGNMENTS, TO THE GUARDIAN TRUST COMPANY, OF CLEVELAND, OHIO, A CORPORATION OF OHIO

APPARATUS FOR CUTTING MATERIALS

Application filed February 6, 1926. Serial No. 86,380.

This invention relates to the art of cutting and is particularly concerned with apparatus for cutting materials which includes a new and improved cutter, means for moving the cutter toward and away from the inner surface of the drum and means for guiding the material carrying drum rotatably about a horizontal axis.

This invention has many applications which will be apparent to those skilled in the art, but is particularly concerned with cutting machines of the type disclosed in the application of George R. Napier, Serial No. 31,423, filed May 19, 1925.

The method of cutting as disclosed in that application may be described briefly as comprising a method in which the materials to be cut are subjected to centrifugal force, preferably in a vertical plane, and are cut by cutting means extending radially into, but not entirely through, all the material. It also includes a mixing of the materials being cut which takes places simultaneously with the cutting, as well as a thorough and complete mixing of the cut material either immediately after, or, if desired, during the cutting operation. This method is particularly applicable to the preparation of food or similar materials where it is desired to cut the material to a certain fineness without crushing it or extracting or pressing out juices or liquids contained therein.

The apparatus of that invention may be described briefly as comprising a rotatable container or drum which will retain material to be cut and in which the material may be subjected to centrifugal force, preferably in a substantially vertical plane. Means are provided for rotating and laterally guiding the container and also for actuating cutting means which operatively engage with and cut the material in the container without, however, coming into actual contact with the inner surface of the container. A rotary cutting means consisting of one or more cutters and means for moving it toward or away from the inner surface of the container are employed. In the present application are disclosed additional drum guiding means as well as additional means for moving the cutting means toward and away from the drum; and claims generic to the guiding means and to the cutter moving means are presented herein.

One embodiment of my invention will be described more fully hereinafter, reference being had to the drawings acompanying and forming a part of this specification and in which—

Fig. 1 is a side elevation of one form of apparatus embodying my invention;

Fig. 2 is a vertical section taken substantially on line 2—2 of Fig. 1;

Fig. 3 is a section taken on line 3—3 of Fig. 1; and

Fig. 4 is a fragmentary view taken on line 4—4 of Fig. 1 showing the drum and one of the rollers on which it runs.

The device shown in the figures comprises a material retaining container or drum 1 which is mounted for rotation preferably in a vertical plane, that is, about a horizontal axis. Cutting means 2 is movable toward and away from the inner surface 4 of the container and may be withdrawn completely out of contact with the material carried by the container, but is at all times maintained out of substantial contact with and does not run against the inner surface 1a of the container 1. Preferably a space equal to the thickness of an ordinary sheet of paper is maintained between the cutting means and the inner surface of the container.

The material-retaining-container 1 consists of a circular drum having an inner surface 4 and peripheral side flanges 3 extending inwardly at each end and in the plane of the drum 1, which flanges are preferably continued in a direction generally transverse to the plane of rotation of the drum and are provided at their outer extremities with substantially parallel oppositely extending flanges 5. This drum 1 may consist of a single element or part or, as shown, may be made up of two substantially circular cooperating sections secured together, as by bolts 6.

The drum 1 runs on flat-faced rollers 7 carried by the shafts 8 and 9 which extend substantially parallel to the axis of rotation of the drum and are mounted in the housing 10. This housing 10 is preferably split horizontally at about the center of the drum so that upper half 11 of the housing may be removed to expose the drum. Securing means 12 hold the two sections of the housing in assembled relation.

Means for rotating the drum may be carried by the housing. In the embodiment illustrated it consists of a motor (not shown) supported at one end of the lower portion of the housing 10 and within a housing 14 and connected by a belt, chain, or other suitable driving means (not shown) to a pulley or gear 13 keyed to the drive axles 8. Power from the motor is transmitted through the driving means to the axle 8 and thence to the drum through a gear 14a attached to the axle 8, and meshing with the annular rack 15 which is attached to the exterior of the drum, as by bolts 6.

The cutting means illustrated comprises one or more cutting blades 2, preferably in the form of discs, carried on a shaft 16 disposed substantially parallel to the axis of the drum. This cutter shaft 16 extends laterally beyond either side of the drum and housing and is supported at its ends in suitable bearings 17 carried by arms 18 and 19. The arm 18 is rotatably supported on one end of shaft 8 while arm 19 is rotatably supported in a suitable opening in housing 10 and about the other end of shaft 8. At their other ends these arms 18 and 19 are carried by adjustable links 20 which are connected to crank arms 21 secured to a cross shaft 22 rotatably mounted in the housing 10.

The shaft 22 is provided with a crank arm 23 by which it may be rotated to raise or lower the cutter shaft. A rod 24 is pivoted at one end to crank arm 23 to actuate the latter. The rod extends upwardly through the side of housing 10 and its upper end is threaded to cooperate with the internally threaded hub of hand wheel 25. Thus, by rotating the hand wheel, the rod is drawn through the wheel hub and the cutter shaft is conveniently raised or lowered. Preferably the hub of the hand wheel is rotatably mounted in a bearing 26 which is trunnioned to the housing 10 and allows for tilting of the rod while preventing axial movement of the rod. Adjustable stops 27 carried by the housing 10 afford rests for the arms 18 and 19. These stops, by limiting the movement of the cutter-shaft-carrying-arms 18 and 19, determine the amount of space between the cutters and the inner surface of the drum.

The cutters illustrated consist of thin metal discs 2 having sharp edges 2a, the center of each disc being perforated to slide over the cutter shaft 16. Each blade has disposed on either side thereof a filler block 28 which is preferably keyed to the shaft 16 to prevent rotation thereof relative to the shaft. Lock nuts 29 engaging the filler blocks at opposite ends of the cutting device secure the discs and filler blocks in assembled relation with any desired degree of frictional engagement, but preferably are so adjusted that the cutters normally rotate with the shaft 16 and any cutter 2 may cease rotating if it encounters any obstacle which would be likely to break the cutter if it could not stop. The cutter shaft is rotated and reciprocated lengthwise by mechanism including a lever 30 and a worm gear 31 housed within the cutter-shaft-carrying-arm 19.

Near the top and preferably on about the vertical center line of the drum housing, means, comprising a chute 32 open at the inner and top end and at the outer end, are suspended for receiving material discharged from the drum. A scraper 33 or other suitable means is provided on a rod 34 which is rotatably carried by the drum housing section 11 so that upon rotation of a handle 35 connected therewith, the scraper may be brought into substantial contact with the inner surfaces of the drum to scrape or remove therefrom the material carried by the drum and to discharge the same into the chute 32. It will be understood that the chute should be sufficiently large to hold the normal content of the drum, since the scraper serves to remove all of the material from the drum in one rotation of the drum. Additional means for more thoroughly intimately and uniformly mixing the contents of the drum are shown in Fig. 1 comprising a shaft 36 rotatably mounted on the drum housing 11 and which carries a skeleton frame 37, one side of which may be brought into engagement with the inner surface of the drum. This agitating device is actuated by movement of a handle 38 connected to the shaft 36 and may be operated at any time either during the cutting operation or subsequent thereto.

Means are provided for guiding and preventing lateral movement of the drum. The means shown comprises rollers 39 which project through openings 40 in opposite sides of the housing 10 and bear against the ends of the drum. Each roller 39 is housed in a bracket 41 attached to housing 10, and is rotatably mounted with anti-friction bearings 42 on a spindle or stud 43. The spindle 43 preferably is formed with a central portion engageable with the roller 39 and eccentric with respect to the end portions 44 thereof which engage with the bracket 41. By rotating the spindle the position of the roller with respect to the drum 1 may be adjusted and regulated. The spindle is retained in adjusted position by a set screw (not shown) extending through the bracket. There are, of course, many other suitable ways in which the roller may be adjustably mounted, although the mounting just described is the present preferred form.

Having thus described my invention so that those skilled in the art may be enabled to practice the same, what I desire to secure by Letters Patent is defined by what is claimed.

What is claimed is:—

1. In combination, a housing, a drum rotatably supported within the housing, cutting means cooperating with and disposed within the drum, a rotatable shaft carried by the housing, means operatively connecting the said cutting means and shaft, and means to rotate said rotatable shaft and thereby move the cutting means toward and away from the inner surface of the drum.

2. In combination, a housing, a drum rotatably supported within the housing, a cutter shaft projecting through the drum, cutting means on said cutter shaft, a rotatable shaft within the housing operatively engageable with said cutter shaft for moving the cutter shaft toward and away from the inner surface of the drum, and a shaft projecting through the housing and operatively engageable with said rotatable shaft for rotating same.

3. In combination, a housing, a drum rotatably mounted within the housing, a cutter shaft projecting through the drum, cutting means on said cutter shaft, a rotatable shaft within the housing operatively engageable with said cutter shaft for moving the cutter shaft toward and away from the inner surface of the drum, a worm-gear located on said rotatable shaft, a control shaft projecting through the housing, a worm located on said control shaft and engageable with said worm gear and means for rotating said control shaft.

4. In combination, a housing, a drum rotatably mounted within the housing, a cutter shaft projecting through the drum, cutting means on said cutter shaft, pivoted arms for supporting the cutter shaft, adjustable links operatively connected to said arms, a rotatable shaft operatively connected to said links for moving the cutter shaft toward and away from the inner surface of the drum, and means for rotating said rotatable shaft.

5. In combination, a housing, a drum rotatably mounted within the housing, a cutter shaft projecting through the drum, cutting means on said cutter shaft, pivoted arms for supporting the cutter shaft, adjustable links operatively connected to said arms, a rotatable shaft having crank arms thereon connected to said links for moving the cutter shaft toward and away from the inner surface of the drum, and means for rotating said rotatable shaft.

6. In combination, a housing, a drum rotatably mounted within the housing, a cutter shaft projecting through the drum, cutting means on said cutter shaft, pivoted arms for supporting the cutter shaft, adjustable links operatively connected to said arms, a rotatable shaft operatively connected to said links for moving the cutter shaft toward and away from the inner surface of the drum, and a control shaft projecting through the housing and operatively engaging with the rotatable shaft for rotating same.

7. In combination, a housing, a drum rotatably mounted within the housing, a cutter shaft projecting through the drum, cutting means on said cutter shaft, pivoted arms for supporting the cutter shaft, adjustable links operatively connected to said arms, a rotatable shaft operatively connected to said links for moving the cutter shaft toward and away from the inner surface of the drum, a crank arm on said rotatable shaft, a control shaft projecting through the housing and secured to the crank arm and means for rotating said control shaft.

8. In a cutting machine in combination, a housing having parallel portions, a drum rotatably disposed between the said parallel portions and having lateral sides parallel therewith, means carried by the said portions and engageable with the lateral sides of the drum for maintaining the drum out of contact with the said portions, a cutter shaft carrying cutting means operable within and maintained out of contact with the drum, and means for rotating the drum and cutting means.

9. In a cutting machine in combination, a drum rotatable about a horizontal axis, guide means insuring rotation of the drum in a fixed path, cutting means operatively disposed within the drum, means for fixing the position of the cutting means radially with respect to the axis of the drum, and means for rotating the drum and rotating and moving the cutting means longitudinally.

10. In a cutting machine in combination, a drum rotatable about a horizontal axis, guide means insuring rotation of the drum in a fixed path, cutting means operatively disposed within the drum, means for fixing the position of the cutting means radially with respect to the axis of the drum while permitting rotational and axially longitudinal movement of the cutting means, means for rotating the drum in its fixed path, and means for imparting rotational and axially longitudinal movement to the cutting means while the latter is maintained in its fixed position with respect to the axis of the drum.

11. In a cutting machine in combination, a drum, means for rotatably supporting the drum upon a horizontal axis, adjustable antifriction guide means insuring rotation of the drum in a fixed path, cutting means operatively disposed within the drum, means for fixing the position of the cutting means radially with respect to the axis of the drum while permitting rotational and axially longitudinal movement of the cutting means, and means for rotating the drum and rotating and moving the cutting means longitudinally.

12. In a cutting machine in combination, a housing, a drum having radial lateral sides, means for rotatably supporting the drum within the housing, means engageable with the lateral sides of the drum for maintaining the drum in spaced relation to the housing, cutting means disposed within the drum, means for maintaining the cutting means in spaced relation to the drum, and means for rotating the drum and cutting means.

13. In a cutting machine in combination, a housing, a drum, means for rotatably supporting the drum within the housing, means for variably maintaining the drum in spaced relation to the housing, cutting means disposed within the drum, means for maintaining the cutting means in spaced relation to the drum, and means for rotating the drum and cutting means.

In testimony whereof I hereunto affix my signature this 2nd day of February, 1926.

EDWARD P. BURRELL.